Feb. 28, 1956　　　F. V. ATKESON　　　2,736,218
CUTTING TOOLS
Filed Oct. 14, 1952　　　　　　　　　　2 Sheets-Sheet 1
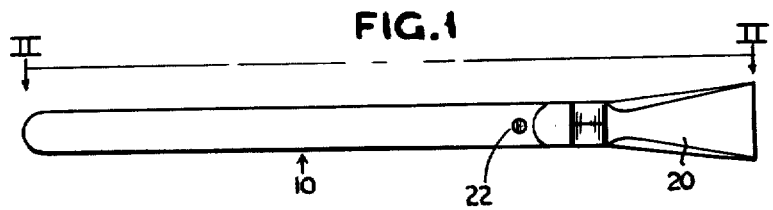
FIG. 1
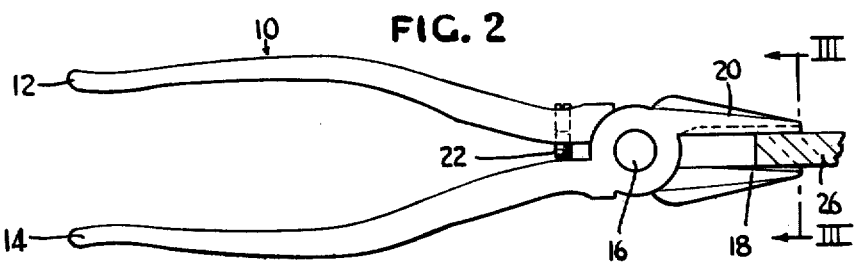
FIG. 2
FIG. 3
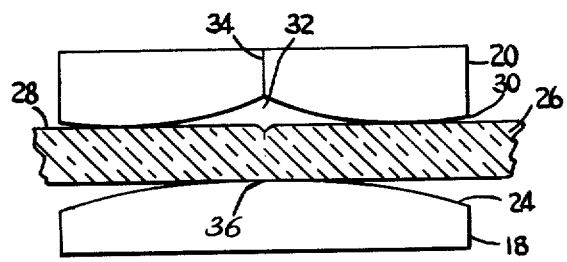
FIG. 4
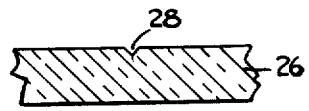
FIG. 5
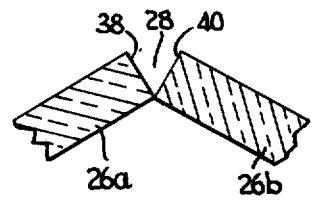
FIG. 7
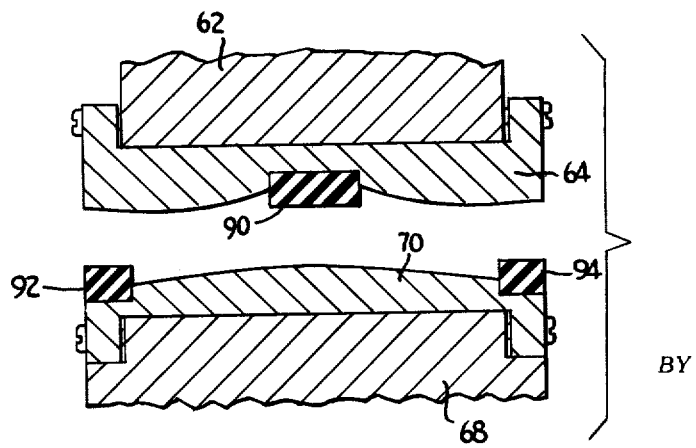
INVENTOR.
FLORIAN V. ATKESON
BY
Oscar L. Spencer
ATTORNEY INVENTOR.
FLORIAN V. ATKESON
BY
Oscar L Spencer
ATTORNEY

United States Patent Office 2,736,218
Patented Feb. 28, 1956

2,736,218
CUTTING TOOLS

Florian V. Atkeson, Tarentum, Pa., assignor to Pittsburgh Plate Glass Company, Allegheny County, Pa., a corporation of Pennsylvania Application October 14, 1952, Serial No. 314,705

9 Claims. (Cl. 81—5.1)

This invention relates to tools for cutting materials which are subject to failure under tension, such as glass, tile such as bathroom wall tile, thin sections of refractory brick, ceramics, and natural stone used for decorative or structural purposes such as marble and particularly to mechanical means for opening or running a cut through a sheet of such material along a score line previously made on the surface of the sheet with a device such as a glass cutter.

For purposes of simplification, the following description of certain devices embodying the concepts of the present invention will be limited to their specific use in the cutting of glass. However, it will be appreciated that the principles described herein are also suitable for teaching the use of the hereinafter disclosed cutting devices for use in cutting any brittle material that tends to fail upon the application of tension. The term "glass-like material" as used in the present application shall be construed to include all substances which are subject to separation under tension.

A conventional method of cutting glass is to first score a surface of the glass by a longitudinal score line made by a diamond, steel, carbide or other cutter and then to open or run the cut in the glass indicated by the score line by applying a moment of force on each side of the score line utilizing the under surface of the glass directly below the score line as a fulcrum, thereby snapping the glass along the line of the score line. A considerable degree of expertness is required to have the glass cutting process result in glass pieces having smooth edges.

An object of the present invention is to provide means whereby a sheet of material subject to failure under tension, such as glass may be broken along the line of a longitudinal score line, thereby resulting in the formation of a plurality of glass pieces having smooth edges.

Another object of this invention is to provide means for cutting a sheet of plane or curved glass-like material into a plurality of plane or curved pieces, respectively, without shattering or spalling the glass in the process.

The present invention is an improvement over prior art glass cutters, of which the cutter disclosed in Patent No. 2,212,599, issued August 27, 1940 to R. F. Hall is typical. In the device disclosed in the aforementioned patent, upon the application of moments of force upon the glass surface on both sides of the score line, the glass upon rotating when the cut is opened, is stressed by the compression of the glass directly under the score line, thereby introducing a possible cause of spalling. By substituting applicant's device for that of Hall, this tendency to spall is substantially eliminated, since the glass is permitted to roll on the surfaces of the opposing jaws of the tool, thereby permitting the surfaces on the opposite sides of the cut to separate from each other rather than be forced against each other to produce the stresses resulting in spalling.

Several embodiments of the invention include a set of hand operated pliers for cutting glass having a thickness up to approximately ⅜ inch, a hydraulically operated vise for cutting thicker glass, and an additional embodiment similar to the second embodiment but provided with an additional safety factor to prevent the shattering of thick glass due to the high stresses involved during opening.

The above and further objects will become apparent upon further study of the following specification taken in conjunction with the accompanying drawings which depict certain specific embodiments of my invention. It is to be understood, however, that the scope of the invention is not limited to the specific embodiments described herein but are limited only by the scope of the accompanying claims.

In the drawing:

Fig. 1 is a side elevation view of one embodiment of my present invention that is especially useful in cutting glass having a thickness up to about ⅜ inch by hand;

Fig. 2 is a plan view of the device shown in Fig. 1 taken along the lines II—II of Fig. 1;

Fig. 3 is an end view of a portion of the device shown in Figs. 1 and 2 taken along the lines III—III of Fig. 2;

Fig. 4 is an enlarged cross-sectional view of a portion of glass taken after a cut has been scored, but before the cut has been run;

Fig. 5 is a view similar to Fig. 4, showing on an exaggerated scale the tendency of the glass to separate at the score line during the cut-running operation.

Fig. 7 is an enlarged cross-sectional view of the jaws of a vise similar to that included in the embodiment of Fig. 6, but further provided with an additional safety feature.

Figure 6:
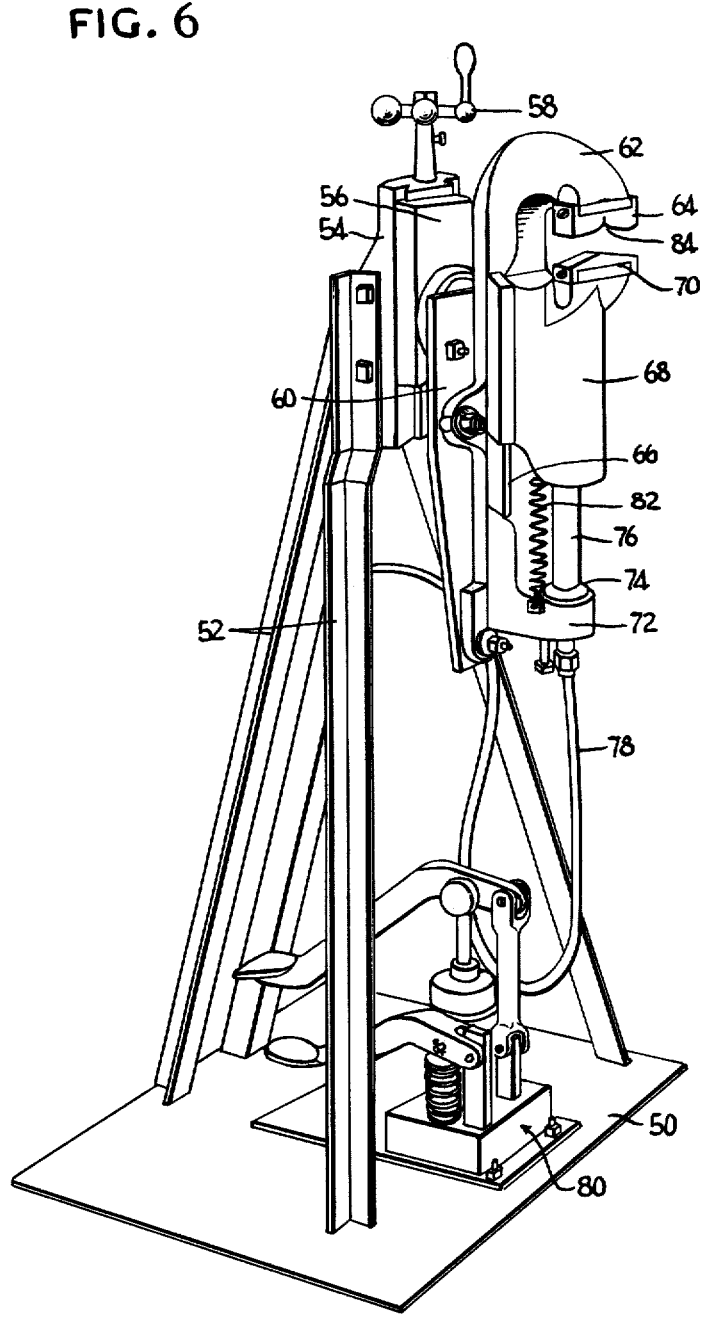
Fig. 6 is a perspective view of a modification of the present invention especially designed to cut thicker sheets of glass than the first embodiment.

Turning now to Figs. 1, 2 and 3, an embodiment of the present invention disclosing a hand operated set of pliers is described.

In these figures, reference numeral 10 represents a pair of pliers provided with a pair of handles 12 and 14 pivoted on a pivot pin 16 and extending beyond the pivot pin to provide jaws 18 and 20. A set screw 22 is provided in handle 12 to adjust the minimum spacing between jaws 18 and 20 in order to accommodate the pliers to the thickness of glass desired to be cut. This set, or overriding screw provides a stop in order that glass between the plier jaws will not be crushed when a cut suddenly opens. Other equivalent means, such as a lock nut and lock washer, may be substituted for the set screw.

In practice, adjustments for glass thickness are made by grasping the glass with the pliers and adjusting the set screw to such length that the pliers just hold the glass without slipping. The set screw is then backed off, loosened from one quarter to three quarters turn to provide excess travel. Short cuts require less jaw travel after contact than do long cuts.

As seen in greater detail in Fig. 3, wherein is shown an end view of the jaws of the pliers, surface 24 of jaw 18 is rounded convexly in cross section to provide a line contact with the section of glass 26 being cut at the surface opposite the score 28. Thus, no matter how the glass 26 is titlted in relation to surface 24, a line of contact between the glass and the surface is always maintained. The location of this line of contact is related to the amount of the opening in the cut 28. On the surface 30 of jaw 20 a groove 32 is provided in such a location as to oppose the highest portion of the surface 24. Laterally from both sides of groove 32 as seen in Fig. 3 are a pair of convexly curved surfaces.

An alignment marker 34 is provided on the end surface of upper jaw 20. This marker is aligned with the highest portion of the surface 24 and the groove 32 of surface 30 respectively, in order to provide means whereby an operator cutting glass can correctly align the pliers with the score previously formed in one surface of the glass.

In operation, a longitudinal score line 28 is first scored on one surface of a glass plate 26. Indicating marker 34 is then aligned with the cut in such a manner that jaw 20 opposes the surface of the glass containing the cut, and jaw 18 opposes the opposite surface of the glass. Pressure applied to handles 12 and 14 results in the application of opposing moments of force by jaws 18 and 20 on the opposite surfaces of the glass 26. The glass is forced to be pivoted about point 36 formed at the uppermost point on surface 24 of jaw 18 and the surface of the glass directly opposite the score line 28. As additional pressure is applied, the score line 28 is deepened until the score extends from surface to surface of the glass. At the same time this deepening of the score is gradually advanced longitudinally of the glass looking into the drawing in the view shown in Fig. 3. This unevenness in the depth of the score causes the glass plate being cut to be rolled from the horizontal position shown in Fig. 3 into other positions depending upon the length and depth of the score line at that moment.

By providing a rounded convex surface 24 on jaw 18 and a pair of rounded convex surfaces 30 on opposite sides of the groove 32 on jaw 20, provision is made for a uniform line contact between the glass surfaces and the opposing surfaces of the jaws of the pliers no matter how much rotation is induced in the individual cut pieces formed from the original location of the scored glass piece. Thus, during the cut-running operation, the score line 28 opens from the position shown in Fig. 4 through that shown in Fig. 5 until surfaces 38 and 40 extend from the top to the bottom of the glass being cut. By virtue of the ability of glass sections 26a and 26b to roll on surfaces 24 and 30 while the cut 28 is being run, surfaces 38 and 40 tend to separate from each other. Therefore, stresses tending to compress the glass beneath the score line are prevented from occurring during the cut-running operation and the resulting cut is relatively smooth along the direction of the score line and relatively free from imperfections due to spalling inherent in prior art devices, such as the glass cutting appliance described in aforementioned Patent No. 2,212,599 to R. F. Hall.

For cutting glass for thicknesses greater than ⅜ inch, the use of hand operated pliers is impractical and use is made of mechanical means for providing pressure sufficient to cut glass of greater thicknesses. For example, a force of nearly 3000 pounds is required to open 1¼ inch thick plate glass. The cutting of heavy glass has always presented a problem which may be visualized when it is realized that the opening stress varies approximately with the fourth power of the thickness of the glass sheet being cut.

An embodiment of a device suitable for cutting thicker glass sheets and containing the novel features disclosed in the prior embodiment is shown in Fig. 6. A horizontal base 50 has extending substantially vertically upwardly therefrom and secured thereto a plurality of L-shaped supports 52 which are secured in their upper portions to a vertically disposed member 54. A slidable member 56 abuts member 54 and is movable vertically relative thereto by a worm gear arrangement (not shown) attached to a shaft rotated by a handle 58. Upon rotation of the handle, member 56 is moved vertically in sliding engagement with member 54 in a vertical direction either upwardly or downwardly depending upon the direction of rotation of handle 58. Means (not shown) are provided for locking the members 54 and 56 in a relatively desired position. Attached to member 56 by a plurality of bolts is a plate 60 to which in turn is attached an inverted J-shaped element 62, the hook end of which acts as a support to which upper jaw member 64 is attached. The side portion of the J-shaped member 62 is provided with a pair of channels 66 upon which may be slid sliding member 68. A lower jaw member 70 is attached to the surface of the latter disposed against upper jaw member 64. A horizontally extending portion 72 extends from the lower end of J-shaped element 62 below the slides 66 and is provided with a port 74 through which a hydraulic piston element 76 is extended upwardly in slidable engagement with a surrounding channel portion contained within member 68.

Vertical and angular adjustments are required to set up the cutting mechanism at proper height and level relative to a table on which glass is handled.

A hydraulic vise 80 which may be either foot operated or operated by control of a motor driven hydraulic pump-accumulator-valve system supplies the pressure necessary to operate the hydraulic piston via a connecting hose 78. The hydraulic vise 80 is also provided with a relief valve mechanism (not shown) to release the pressure between the jaw members. Upon release of pressure, a compression spring 82 connected between the lower arm 72 and the movable element 68 acts to pull jaw 70 away from jaw 64, thereby releasing the pressure on the glass sheet being cut, when it is desired to do so.

The operation of the embodiment disclosed in Fig. 6 is as follows. A thick glass sheet that is desired to be cut is placed upon a table and the table is moved so that its edge is adjacent the position of jaws 64 and 70, with the edge of the glass extending over the edge of the table to a position between the respective jaws. If necessary, handle 58 is rotated to change the vertical position of slidable member 56. The position of the entire J-shaped member 62 and the balance of the glass cut running mechanism with it is changed until jaw 64 is touching the upper surface of the glass at the lowermost portion of the surface of jaw 64. A longitudinal score line made in the upper surface of the glass is aligned with aligning marker 84 contained at the end portion of jaw 64. Pressure on the jaws is produced by the hydraulic vise on which the shaped jaws are bolted.

Jaw 64 is shaped proportionately to the shape of jaw 20 and jaw 70 is shaped proportionately to the shape of jaw 18 to insure that the operation of this embodiment is similar to that shown in Figs. 1, 2 and 3.

Running of the cut of heavy glass often takes place with explosive violence such that the contact of the metallic jaws with the glass can and does cause shattering and spalling of the glass at the moment of opening.

In order to eliminate such malfunction, the opposing surfaces of the jaws are provided, as shown in Fig. 7, with pads 90, 92 and 94 of soft, resilient pliable material having a type A Shore durometer reading of at least 50, such as neoprene or hard rubber, in the lowermost portions of the opposing jaw surfaces. Thus, jaw 64 is provided with pad 90 in the groove formed between the two convex surfaces formed on either side of the alignment mark and jaw 70 is provided with pads 92 and 94 on the lowermost portion of its rounded convex surface opposing jaw 64. Rectangular shaped grooves are cut into the opposing surfaces in order to receive the pads and the pads are attached to the metal within the grooves by means of a suitable rubber to metal binder such as a mixture of a phenol aldehyde resin with a butadiene-acrylonitrile copolymer composition. The thickness of the pads is such that the pads extend upwardly from the opposing surfaces of the jaws 64 and 70 an amount approximately ¹⁄₁₆ inch more than the highest portion of the associated jaw surface. Thus, upon application of the pressure between the jaws of the vise, the glass will be firmly grasped by the rubber pads before, during, and after running of the cut. Therefore, sudden motion of glass against metal portions of the jaws will be damped or even completely prevented.

Experience has shown that the shapes of the jaws are most important. Best results have been attained when the mating curves are formed so as to approximate parabolic sections. That is, the upper jaw is formed of two parabolas meeting to form a cusp with the bottom jaw forming a parabola such that the vertex is the first point of glass contact.

It is understood that the scope of this invention is not limited to the specific embodiments described herein, which were described in detail for purpose of illustration of the principles of this invention only and that various other equivalents which will become apparent upon the study of this disclosure are to be considered within the purview of this invention as limited only by the accompanying claims.

What is claimed is:

1. A device for use in cutting glass-like material comprising a first element having a surface of convex contour protruding centrally, an opposed element having a pair of convexly contoured surfaces on opposite sides of a depressed center portion, and means for urging the elements against opposite sides of a piece of glass-like material with the protruding portion of the surface of the first element disposed in line contact with the glass-like material on the side opposite from and cross-sectionally aligned with a score line in the glass-like material.

2. A device for use in cutting glass-like material comprising a first element having a surface of convex contour protruding centrally, an opposed element having a pair of convexly contoured surfaces on opposite sides of a depressed center portion, and pivoted means for urging the elements against opposite sides of a piece of glass-like material with the protruding portion of the surface of the first element disposed in line contact with the glass-like material on the side opposite from and cross-sectionally aligned with a score line in the glass-like material.

3. A device for use in cutting glass-like material comprising a first element having a surface of convex contour protruding centrally, an opposed element having a pair of convexly contoured surfaces on opposite sides of a depressed center portion, and pneumatically operated means for urging the elements against opposite sides of a piece of glass-like material with the protruding portion of the surface of the first element disposed in line contact with the glass-like material on the side opposite from and cross-sectionally aligned with a score line in the glass-like material.

4. A device for use in cutting glass-like material comprising a first element having a surface of convex contour protruding centrally, an opposed element having a pair of convexly contoured surfaces on opposite sides of a depressed center portion, means for indicating a position of alignment between the device and a score line formed in a surface of the glass-like material and means for urging the elements against opposite sides of a piece of glass-like material with the protruding portion of the surface of the first element disposed in line contact with the glass-like material on the side opposite from and cross-sectionally aligned with the score line in the glass-like material.

5. A device for use in cutting glass-like material comprising a first element having a surface of convex contour protruding centrally, an opposed element having a pair of convexly contoured surfaces on opposite sides of a depressed center portion, means for urging the elements against opposite sides of a piece of glass-like material with the protruding portion of the surface of the first element disposed in line contact with the glass-like material on the side opposite from and cross-sectionally aligned with a score line in the glass-like material and shock absorbing means disposed on the first and opposed elements.

6. A device for cutting glass-like material comprising a first element having a surface of convex contour, protruding centrally, an opposed element having a pair of convexly contoured surfaces on opposite sides of a depressed center portion, means for indicating a position of alignment between the device and a score line formed in a surface of the glass-like material, means for urging the elements against opposite sides of a piece of glass-like material with the protruding portion of the surface of the first element disposed in line contact with the glass-like material on the side opposite from and cross-sectionally aligned with the score line in the glass-like material, and shock absorbing means disposed on the first and opposed elements.

7. A device for cutting glass-like material comprising a first element having a surface of convex contour protruding centrally, an opposed element having a pair of convexly contoured surfaces on opposite sides of a depressed center portion, means for indicating a position of alignment between the device and a score line formed in a surface of the glass-like material, means for urging the elements against opposite sides of a piece of glass-like material with the protruding portion of the surface of the first element disposed in line contact with the glass-like material on the side opposite from and cross-sectionally aligned with the score line in the glass-like material and compressible shock-absorbing means extending upwardly from the lowermost portions of the surfaces of said first and said opposed elements to a height greater than that of the highest portions of the respective surfaces.

8. A device for use in cutting glass-like material comprising a first element having a surface of convex contour protruding centrally, an opposed element having a depressed center portion aligned with the protruding portion of the convex surface of the first element and a pair of convexly contoured surfaces on opposite sides of its center portion, and means for urging the elements against opposite sides of a piece of glass-like material with the protruding portion of the surface of the first element and the depressed center portion of the opposed element aligned with a score line in the glass-like material, whereby a pair of opening moments are applied to the glass-like material around a fulcrum line cross-sectionally aligned with the score line in the glass-like material to cause the glass-like material to open along the predetermined score line to form two sections of glass-like material, which sections are caused to roll away from stress inducing contact by virtue of the curvature of the surfaces of the first and opposed elements.

9. A tool of the character described comprising a first element having a cylindrical surface of convex contour in cross-section, a second element opposing the first element and having a surface containing a depressed central longitudinal valley portion aligned with the protruding portion of the surface of the first element and a pair of cylindrical surface portions of convex contour in cross-section extending in opposite lateral directions of its depressed central portion, and means for urging the elements against opposite sides of a piece of glass-like material with the protruding portion of the surface of the first element and the depressed center portion of the opposed element aligned longitudinally and adapted to be aligned with a score line in the glass-like material and the highest points on the surface of the second element in transverse alignment with the line of greatest protuberance on the surface of the first element, whereby a pair of opening moments are applied to the glass-like material around a fulcrum line located in longitudinal alignment with the score line to cause the glass-like material to open along the score line to form two sections of glass-like material, which sections are caused to roll away from each other during the urging together of the elements by virtue of the curvature of the surfaces of the first and opposed elements.

References Cited in the file of this patent

UNITED STATES PATENTS

| Number | Name | Date |
| --- | --- | --- |
| 316,430 | Derby | Apr. 21, 1885 |
| 331,812 | Norris | Dec. 8, 1885 |
| 1,640,883 | Coleman | Aug. 30, 1927 |
| 2,005,487 | Zemanek | June 18, 1935 |
| 2,212,599 | Hall | Aug. 27, 1940 |

Dedication 2,736,218.—*Florian V. Atkeson*, Tarentum, Pa. CUTTING TOOLS. Patent dated Feb. 28, 1956. Dedication filed July 25, 1973, by the assignee, *PPG Industries, Inc.*

Hereby dedicates the remainder of its term to the free use and benefit of the People of the United States.

[*Official Gazette December 4, 1973.*]